US012187626B2

(12) United States Patent
Swain et al.

(10) Patent No.: US 12,187,626 B2
(45) Date of Patent: Jan. 7, 2025

(54) APPARATUS AND METHOD FOR PURIFYING WATER

(71) Applicants: Sudhish Madapur Swain, Gaithersburg, MD (US); Sujay Madapur Swain, Gaithersburg, MD (US)

(72) Inventors: Sudhish Madapur Swain, Gaithersburg, MD (US); Sujay Madapur Swain, Gaithersburg, MD (US)

(73) Assignees: Sudhish Madapur Swain, Gaithersburg, MD (US); Sujay Madapur Swain, Gaithersburg, MD (US)

( * ) Notice: Subject to any disclaimer, the term of this patent is extended or adjusted under 35 U.S.C. 154(b) by 287 days.

(21) Appl. No.: 17/479,188

(22) Filed: Sep. 20, 2021

(65) Prior Publication Data

US 2023/0101358 A1 Mar. 30, 2023

(51) Int. Cl.
*C02F 1/32* (2023.01)
*C02F 1/30* (2023.01)

(52) U.S. Cl.
CPC .............. *C02F 1/325* (2013.01); *C02F 1/302* (2013.01); *C02F 2201/3228* (2013.01); *C02F 2303/04* (2013.01); *C02F 2307/12* (2013.01)

(58) Field of Classification Search
CPC ...... C02F 1/32; C02F 1/30; C02F 1/72; C02F 1/70; C02F 1/46; C02F 1/48; B01D 32/34
See application file for complete search history.

(56) References Cited

U.S. PATENT DOCUMENTS

| | | | |
|---|---|---|---|
| 4,563,282 | A | 1/1986 | Wittmann et al. |
| 5,342,779 | A | 8/1994 | Matsumura et al. |
| 7,794,673 | B2 | 9/2010 | Lucas et al. |
| 8,018,130 | B2 | 9/2011 | Van Den Broek et al. |

(Continued)

FOREIGN PATENT DOCUMENTS

| | | | | | |
|---|---|---|---|---|---|
| CN | 105967474 | A | * | 9/2016 | |
| CN | 107226509 | A | * | 10/2017 | .............. C02F 1/302 |
| WO | WO-2010048227 | A2 | * | 4/2010 | ............... C25D 1/08 |

OTHER PUBLICATIONS

CN-107226509-A-translation (Year: 2017).*
CN 105967474 A-translation (Year: 2016).*

*Primary Examiner* — Walter D. Griffin
*Assistant Examiner* — Cameron J Allen
(74) *Attorney, Agent, or Firm* — Raj S. Dave; Dave Law Group LLC

(57) ABSTRACT

An apparatus comprising a microwave oven configured to emit microwave radiation; wherein the microwave oven comprises an interior space; wherein the microwave radiation comprises a first portion and a second portion within the interior space of the microwave oven wherein microwave oven comprises a first side and a second side; a flow tube configured in the interior space of the microwave oven; wherein the flow tube comprises of a first side and a second side; an electrodeless ultraviolet (UV)-emitting bulb configured inside the flow tube; a water flow pump; and wherein the combination of the electrodeless ultraviolet (UV)-emitting bulb and the flow tube housed in the interior space of the microwave oven purifies the contaminated water to a predetermined level of sterilization.

20 Claims, 8 Drawing Sheets

(56) References Cited

U.S. PATENT DOCUMENTS

| | | | |
|---|---|---|---|
| 10,689,275 | B2 | 6/2020 | Huddersman et al. |
| 2005/0115498 | A1 | 6/2005 | Ingram et al. |
| 2009/0120882 | A1 | 5/2009 | Voronov et al. |

* cited by examiner (UV-x) – Water flow inside a UV bulb assembly (UV-i) – Water flow outside a UV bulb assembly Inactivation of EMCV by UV-A at various temperatures (laboratory experiments). (●) 20 °C, (◘) 20 °C, (○) 30 °C, (◆) 40 °C, (✚) 40 °C, (□) 50 °C, (■) 55 °C.

CFU density as a function of UV exposure

Figure a: Without any flow (as mixed)  Figure b: With 3 Liters per 10 Minutes of Water flow  Figure c: With 6 Liters per 10 Minute of Water flow  Figure d: With 16 Liters per 10 Minutes of Water flow (UV-e) – UV bulb sandwiched between two water flow tubes

APPARATUS AND METHOD FOR PURIFYING WATER

FIELD OF THE INVENTION

Embodiments of the present disclosure relates to a water treatment, and more particularly to systems and methods for treating biologically contaminated water to generate potable water.

BACKGROUND OF INVENTION

Until the last century and a half, obtaining clean drinking water was problematic. In ancient and medieval times, except for the Roman period, people living in cities would risk getting sick from drinking water contaminated with E. Coli present in feces or risk contracting deadly diseases like cholera. Even today, public health officials in the US and the developing world have sounded the alarm when it comes to safe drinking water. According to the CDC, over 780 million people globally lack access to clean drinking water. About 60 million people in the US purchase bottled water regularly which costs about $40 per month for a family of 4, since tap water in some places is still not safe to drink. Elsewhere in the developing world, people cannot afford bottled water.

Ultraviolet (UV) light-based water purification is an effective method for disinfecting bacteria present in water. Ultraviolet rays interact with harmful pathogens in a home's water and destroy illness-causing microorganisms by attacking their genetic core (DNA). This is extremely efficient in stopping the microorganisms' ability to reproduce.

Conventional UV disinfectant systems are an effective means of water disinfection for residential point of entry to help disinfect the entire home's water supply. UV disinfectants are recommended to homeowners who may suspect E. coli, Cryptosporidium, Giardia or any other types of bacteria and viruses in the water.

However, conventional UV disinfectant systems are relatively expensive for individual homeowners. Other means to kill bacteria or viruses in water would be to add chemical disinfectants. However, it is not advisable to use chlorine or other chemicals to disinfect water because of the toxic byproducts they create.

SUMMARY OF INVENTION

Embodiments of the present disclosure pertain to an apparatus for purifying biologically contaminated water. A microwave oven has an interior space and is operable to emit a first portion and a second portion of microwave radiation within the interior space. At least one flow tube disposed in the interior space comprises at least one electrodeless ultraviolet (UV)-emitting bulb configured to absorb the first portion of microwave radiation and configured to, in response to absorbing the first portion of microwave radiation, ignite and emit UV radiation that is absorbable by biologically contaminated water flowing through the at least one flow tube. The second portion of microwave radiation is further absorbable by the biologically contaminated water flowing through at least one flow tube to heat the biologically contaminated water to a predetermined temperature. The combination of the second portion of microwave radiation and the UV radiation purifies the biologically contaminated water to a predetermined level of sterilization.

Embodiments of the present disclosure pertain to a method for purifying biologically contaminated water. A source of microwaves, i.e., a magnetron, in a microwave oven, emits a first portion and a second portion of microwave radiation towards at least one flow tube comprising at least one electrodeless UV-emitting bulb. The at least one electrodeless UV-emitting bulb absorbs the first portion of microwave radiation. In response to absorbing the first portion of microwave radiation, the at least one electrodeless UV-emitting bulb emits ultraviolet (UV) radiation. Biologically contaminated water flowing through at least one flow tube absorbs the ultraviolet radiation. The biologically contaminated water further absorbs the second portion of microwave radiation. The UV radiation and the second portion of microwave radiation, used to heat the water to leverage the synergistic effect of UV and temperature, purifies the biologically contaminated water flowing through the at least one flow tube to a predetermined level of sterilization.

In an embodiment, an apparatus comprising: a microwave oven having an interior space; at least one flow tube assembly disposed in the interior space comprising of at least two sections comprising a first section and a second section that are physically isolated from each other, the flow tube assembly comprising a fused silica or a UV transmitting material and having a melting point exceeding 500° C., the first section comprising a first flow channel comprising a first inlet and a first outlet, and the second section comprising a light bulb that generates UV radiation; wherein the flow tube assembly is placed inside the microwave oven; wherein when the microwave oven is powered up: (i) the microwave oven generates microwave energy, (ii) a liquid flows through the first flow channel a first portion of the microwave energy heats the liquid flowing through the first flow channel, and (iii) the light bulb is ignited by a second portion of the microwave energy and UV radiation is generated from the light bulb.

In an embodiment, the liquid contains biologically contaminated water, and the microwave oven heats the biologically contaminated water to a temperature in a range of 35 to 60°.

In an embodiment, the apparatus further comprising: a first container for receiving the biologically contaminated water; a first pipe in fluid communication with the first container; a water flow pump in fluid communication with the first pipe; a second pipe in fluid communication with the water flow pump and a first side of the at least one flow tube assembly. a third pipe in fluid communication with a second side of the at least one flow tube assembly; and a second container in fluid communication with the third pipe for receiving a sterilized water.

In an embodiment, the second pipe is fitted to one side of the at least one flow tube assembly through a first aperture located in a first side of the microwave oven.

In one embodiment, the third pipe is fitted to one side of the at least one flow tube assembly through a second aperture located in a second side of the microwave oven.

In another embodiment, the water flow pump is configured to operate concurrently with delivering of the first portion of the microwave energy and the second portion of the microwave energy.

In yet another embodiment, at least one flow tube assembly is a plurality of flow tube assembly containing at least one electrodeless UV-emitting bulb connected in series with a second pipe and a third pipe.

In one embodiment, at least one electrodeless UV-emitting bulb is longitudinally disposed within the at least one flow tube assembly and comprises an outer surface in contact with an inner surface of the at least one flow tube assembly and an inner surface configured to form a second interior space through which water flows.

In an embodiment, the electrodeless UV-emitting bulb is longitudinally disposed within the flow tube assembly and configured to be in contact with the biologically contaminated water flowing on an outer surface of the electrodeless UV-emitting bulb.

In one embodiment, at least one electrodeless UV-emitting bulb is longitudinally disposed throughout the flow tube assembly.

In an embodiment, an external surface of the flow tube assembly is coated with a coating composition having a physical, an electrical and an optical property as that of quartz.

In another embodiment, the thickness of the coating composition on the external surface is about 10 microns to about 50 microns.

In yet another embodiment, the external surface of the flow tube assembly comprises a UV-reflector.

In an embodiment, the source of microwaves in the microwave oven is a magnetron.

In one embodiment, at least one electrodeless UV-emitting bulb is made of sapphire, quartz, or glass.

In an embodiment, at least one electrodeless UV-emitting bulb comprises mercury.

In one embodiment, at least one flow tube assembly further comprises a third section comprising a second flow channel comprising a second inlet and a second outlet.

In an embodiment, the second section is interposed between the first section and the third section.

In an embodiment, an inlet bifurcates into the first inlet and the second inlet, and an outlet bifurcates into the first outlet and the second outlet.

In an embodiment, a method for purifying biologically contaminated water, comprising: emitting a first portion of microwave radiation and a second portion of microwave radiation, by a source of microwaves in a microwave oven, toward at least one flow tube assembly comprising at least one electrodeless UV-emitting bulb; absorbing, by the at least one electrodeless UV-emitting bulb, the first portion of microwave radiation; and emitting ultraviolet (UV) radiation by the at least one electrodeless UV-emitting bulb in response to absorption of the first portion of microwave radiation; wherein the ultraviolet radiation is absorbable by biologically contaminated water flowing through the at least one flow tube assembly, wherein the second portion of microwave radiation is absorbable by the biologically contaminated water flowing through the at least one flow tube assembly, and wherein the UV radiation and the second portion of microwave radiation purifies the biologically contaminated water to a predetermined level of sterilization.

In one embodiment, a flow rate of the biologically contaminated water through the at least one flow tube assembly is selected to heat the biologically contaminated water to a predetermined temperature while leaving sufficient microwave radiation to ignite the at least one electrodeless UV-emitting bulb.

In an embodiment, at least one electrodeless UV-emitting bulb is longitudinally disposed within the at least one flow tube assembly and comprises an outer surface in contact with an inner surface of the at least one flow tube assembly and an inner surface configured to form a second interior space through which water flows.

In one embodiment, at least one electrodeless UV-emitting bulb is longitudinally disposed within the flow tube assembly and configured to be in contact with the water flowing on an outer surface of the at least one electrodeless UV-emitting bulb.

In an embodiment, the method further comprising, operating a water flow pump concurrently with delivering of the first portion of microwave radiation and the second portion of microwave radiation.

In one embodiment, the method further comprising: receiving, in a first container, the biologically contaminated water; a first pipe in fluid communication with the first container; pumping, by a water flow pump, biologically contaminated water from a first pipe inserted in the first container to a second pipe in fluid communication the at least one flow tube assembly through a first aperture in one side of the microwave oven.

In an embodiment, the second pipe is fitted to one side of the at least one flow tube assembly through a first aperture located in a first side of the microwave oven.

In one embodiment, the method further comprising: flowing, through a third pipe in fluid communication with a second side of the at least one flow tube assembly, a sterilized water into a second container.

In an embodiment, the third pipe is fitted to one side of the at least one flow tube assembly through a second aperture located in a second side of the microwave oven.

In one embodiment, the flow tube assembly comprises a plurality of flow channels for passage of the biologically contaminated water.

In an embodiment, a flow tube assembly comprising at least a first section and a second section physically isolated from each other; wherein the flow tube is fabricated using a having a UV transmitting property more than 70% at a wavelength range of about range from 100 nm to about 400 nm and having a temperature resistance with a melting point more than 500° C.; wherein the first section allows flow of water; wherein the second section contains a gas comprising a noble gas to form a light bulb configured to generate UV radiation when excited by the microwave radiation inside a microwave oven; wherein a first end of the flow tube is connected to a water inlet pipe carrying a biologically contaminated water and a second end of the flow tube is connected to a water outlet pipe carrying a sterilized water; wherein the flow tube is placed inside a microwave oven.

In an embodiment, the second section comprises mercury and/or zinc oxide.

In one embodiment, the second section is concentrically outside the first section.

In an embodiment, the second section is concentrically inside the first section.

In an embodiment, the second section comprises a coating layer comprising a UV transmitting material.

In one embodiment, the coating layer has a thickness in a range of about 10-50 microns.

In an embodiment, the second section comprises a UV-reflector to reflect UV rays towards the first section.

In an embodiment, the gas comprises nitrogen and wherein the noble gas comprises argon.

In an embodiment, the second section is not present throughout a length of the first section.

In an embodiment, the second section is present throughout a length of the first section.

BRIEF DESCRIPTION OF FIGURES

For simplicity and clarity of illustration, the drawing figures illustrate the general manner of construction, and descriptions and details of well-known features and techniques may be omitted to avoid unnecessarily obscuring the present disclosure. It shall not be construed as only way to perform the invention has sought to be patented.

Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denotes the same elements.

DETAILED DESCRIPTION

Definitions and General Techniques

Figure 1A:
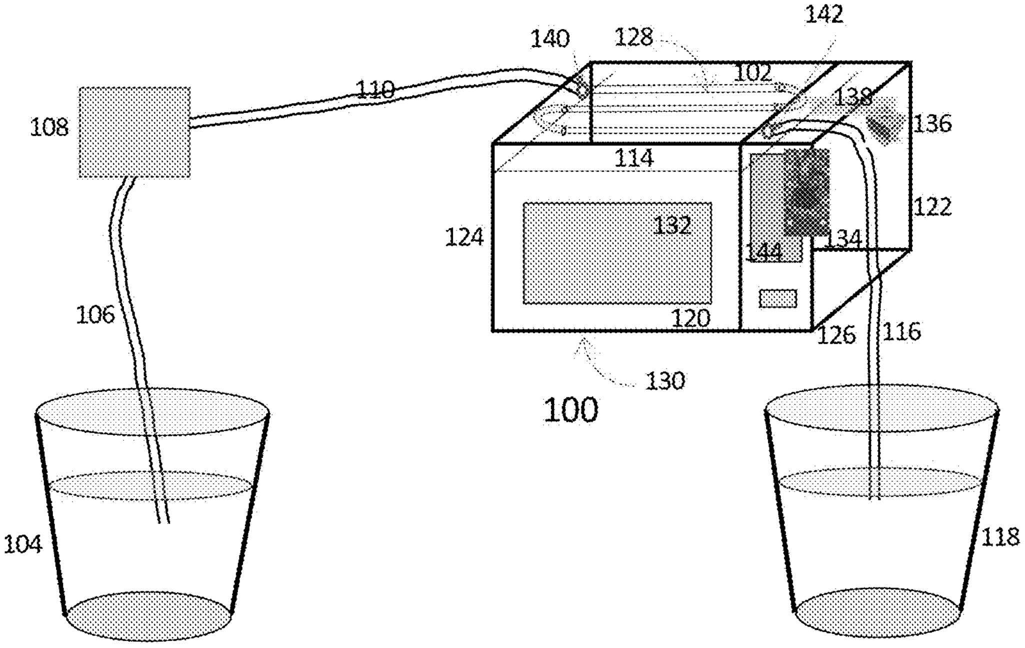
FIG. 1A illustrates an apparatus for purifying water using an electrodeless UV-emitting bulb.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Unless otherwise defined herein, scientific, and technical terms used in connection with the present invention shall have the meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in the art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

The following terms and phrases, unless otherwise indicated, shall be understood to have the following meanings.

"Microwave oven" is defined as a device that emits microwave radiation at a pre-determined wavelength into an internal chamber. The chamber is typically closed to limit the escape of microwaves. Such microwave ovens are not limited but are often used to cook food.

In an embodiment, consumer microwave ovens work around a nominal 2.45 gigahertz (GHz)—a wavelength of 12.2 centimetres (4.80 in) in the 2.4 GHz to 2.5 GHz ISM band-while large industrial/commercial ovens often use 915 megahertz (MHz)-32.8 centimetres (12.9 in).

"Microwave radiation" is a form of electromagnetic radiation with wavelengths ranging from about one meter to one millimeter corresponding to frequencies between 300 MHz and 300 GHz respectively. Microwave ovens use frequencies in one of the ISM (industrial, scientific, medical) bands, which are otherwise used for communication amongst devices that do not need a license to operate, so they do not interfere with other vital radio services.

In an embodiment, different sources define different frequency ranges as microwaves; the above broad definition includes both UHF and EHF (millimeter wave) bands. A more common definition in radio-frequency engineering is the range between 1 and 100 GHz (wavelengths between 0.3 m and 3 mm). In all cases, microwaves include the entire SHF band (3 to 30 GHz, or 10 to 1 cm) at minimum.

Microwaves are widely used in modern technology, for example in point-to-point communication links, wireless networks, microwave radio relay networks, radar, satellite and spacecraft communication, medical diathermy and cancer treatment, remote sensing, radio astronomy, particle accelerators, spectroscopy, industrial heating, collision avoidance systems, garage door openers and keyless entry systems, and for cooking food in microwave ovens.

In an embodiment, a high-power microwave sources use specialized vacuum tubes to generate microwaves. These devices operate on different principles from low-frequency vacuum tubes, using the ballistic motion of electrons in a vacuum under the influence of controlling electric or magnetic fields, and include the magnetron (used in microwave ovens), klystron, traveling-wave tube (TWT), and gyrotron. These devices work in the density modulated mode, rather than the current modulated mode. This means that they work based on clumps of electrons flying ballistically through them, rather than using a continuous stream of electrons.

In an embodiment, a low-power microwave sources use solid-state devices such as the field-effect transistor (at least at lower frequencies), tunnel diodes, Gunn diodes, and IMPATT diodes. Low-power sources are available as benchtop instruments, rackmount instruments, embeddable modules and in card-level formats. A maser is a solid state device which amplifies microwaves using similar principles to the laser, which amplifies higher frequency light waves.

The term "Ultraviolet (UV)" is a form of electromagnetic radiation with wavelength from 10 nm (with a corresponding frequency around 30 PHz) to 400 nm (750 THz), shorter than that of visible light, but longer than X-rays. UV radiation is present in sunlight, and constitutes about 10% of the total electromagnetic radiation output from the Sun. It is also produced by electric arcs and specialized lights, such as mercury-vapor lamps, tanning lamps, and black lights.

The UV region covers the wavelength range from 100-400 nm and is divided into three bands: UVA (315-400 nm) UVB (280-315 nm) UVC (100-280 nm).

Ultraviolet A (UVA) have higher wavelengths, but lower energy levels than the other rays. Long-wavelength UVA covers the range 315-400 nm. Not significantly filtered by the atmosphere. Approximately 90% of UV radiation reaching the Earth's surface. UVA is again divided into UVA-I (340 nm-400 nm) and UVA-II (315 nm-340 nm).

Ultraviolet B (UVB) rays have shorter wavelengths and higher energy levels as compared to UVA rays. UVB covers the range 280 nm-315 nm. Approximately 10% of UV radiation reaching the Earth's surface. Medium-wavelength short-wavelength UVC covers the range 100-280 nm. All solar UVC radiation is absorbed by the ozone layer.

Ultraviolet C (UVC) rays have the shortest wavelengths and highest energy levels of the three types of UV rays. As a result, they can cause serious damage to all life forms.

The term "Electrodeless UV emitting lamp" should be considered broadly. It a gas discharge lamp that emits light in the ultraviolet (UV) and vacuum ultraviolet (VUV) spectra. In other words, the Electrodeless UV lamp is defined as an ultraviolet lamp which can sustain ultraviolet radiation, without excitation by electrodes within the lamp, due to microwave or RF excitation, but includes lamps in which electrodes are provided to assist in commencement of the ultraviolet discharge. An electrodeless lamp uses a principle that electrons collide with gas molecules as they reciprocate in a high frequency alternating electric field that inverts continuously in the direction of the electric field, and the spectrum according to the gas is released.

In an embodiment, ultraviolet lamp for studying electrodeless mode, including with conventional nothing Electrodeless ultraviolet lamp, LED ultraviolet lamp and the microwave excited electrodeless ultraviolet lamp of the similar coiling mode of pole headlamp, compare and Speech, the high-power electrodeless lamp of disinfection and sterilization.

In an embodiment, the use of an electrodeless bulb, which is coupled to an energy source, e.g., a microwave cavity, to emit the broadband radiation pattern in a manner well known by those skilled in the art to generate the desired broadband ultraviolet radiation pattern.

In an embodiment, in an electrodeless ultraviolet lamp system using excitation by microwave energy, the electrodeless plasma lamp is mounted in a metal microwave cavity or microwave chamber or microwave oven.

In an embodiment, the plurality or each of the UV bulbs are electrodeless. This is a non-electrode valve with a discharge tube partly having a single element or a mixed element in the form of steam. Mercury is a preferred element for this purpose. However, alternatives include a mixture of an inert gas and a mercury synthesizer, sodium, and sulfur.

In an embodiment, a liquid processing apparatus for an electrodeless discharge lamp according to the present invention is filled with mercury or a rare gas.

In an embodiment, a plurality of electrodeless discharge lamps excited by high frequency or microwave are provided, and the number of the electrodeless discharge lamps to be turned on is controlled in accordance with a change in the flow rate of the liquid to be treated. According to the present invention, in the electrodeless discharge lamp liquid processing apparatus, the number of lightings of the electrodeless discharge lamps is controlled to adjust the irradiation intensity of the ultraviolet rays according to the fluctuation of the flow rate of the liquid to be treated.

Further, the electrodeless discharge lamp liquid processing apparatus according to the present invention is characterized in that dimming control of the electrodeless discharge lamp is performed to adjust the intensity of ultraviolet irradiation in accordance with the flow rate fluctuation of the liquid to be treated. And This eliminates a sudden change in the irradiation area due to the control of the number of lightings, makes the ultraviolet irradiation intensity on the liquid to be treated spatially uniform, and smoothly controls the lighting power and the number of lightings of the electrodeless discharge lamp. By setting the minimum number, the processing efficiency can be further increased. By using the control of the number of lightings of the electrodeless discharge lamp and the dimming control together, the processing efficiency can be increased over a wider range.

Preferably, the ratio between the diameter and the length of the inside of the electrodeless discharge lamp in the electrodeless discharge lamp liquid treatment apparatus is set to 1:25 or less. Thus, by making the ratio of the inner diameter and length of the electrodeless discharge lamp thick and short to 1:25 or less, the ultraviolet output after starting and restarting the lighting to a steady value in a short time. By starting up, the processing efficiency can be increased. In addition, by adopting such a shape, uniform discharge can be caused in the length direction of the electrodeless discharge lamp, and the ultraviolet output can be made spatially uniform. Thereby, the lighting power and the number of lightings of the electrodeless discharge lamp can be set to the required minimum numbers, and the processing efficiency can be increased.

The term "Predetermined temperature" is defined as the temperature which is decided in advance during a process. An increase in temperature of contaminated, and UV has shown a synergistic effect in decreasing the microbial count of the contaminated water.

In an embodiment, an increase in temperature of contaminated water inside the microwave oven in a range of about 20° C. to about 99° C., range of about 35° C. to about 80° C., range of about 30° C. to about 90° C., range of about 40° C. to about 90° C., range of about 30° C. to about 70° C., range of about 50° C. to about 90° C. In an embodiment, an increase in temperature of the biologically contaminated water could be 30° C., 35° C., 40° C., 50° C., 55° C., 60° C., 65° C., 70° C., 75° C., 80° C., 85° C., 90° C., 95° C. or more.

In a particular embodiment, predetermined temperature is about 55° C.

The term "Predetermined level of sterilization" is defined as a level of sterilization of contaminated water that is intended to achieve by one or various combination of embodiments of this invention.

In an embodiment, predetermined level of sterilization in wastewater ranges from about 60% to about 100%. In an embodiment, predetermined level of sterilization may be 30%, 40%, 50%, 60%, 65%, 70%, 75%, 80%, 85%, 90%, 95%, or 100%.

In an embodiment, the biological contaminant is decreased in the contaminated water by about 10%, 20%, 30%, 40%, 50%, 60%, 65%, 70%, 75%, 80%, 85%, 90%, 95%, or 100%. In an embodiment, the biological contaminant is decreased in the contaminated water in a range of 50% to 100%.

In an embodiment, E. coli in the contaminated water is decreased in a range of 50% to 100%. In an embodiment, E. coli in the contaminated water is decreased by about 10%, 20%, 30%, 40%, 50%, 60%, 65%, 70%, 75%, 80%, 85%, 90%, 95%, or 100%

The term "Flow rate" is defined as the volume of water which passes per unit time.

The term "Contaminated water" is defined as water whose characteristics has changed due to the presence of contaminants. U.S. Environmental Protection Agency (EPA) sets the standards for drinking water quality and monitors states, local authorities, and water suppliers who enforce those standards. It has passed a Safe Drinking Water Act (SDWA). According to this Act, The Safe Drinking Water Act defines the term "contaminant" as meaning any physical, chemical, biological, or radiological substance or matter in water. Therefore, the law defines "contaminant" very broadly as being anything other than water molecules. The following are general categories of drinking water contaminants and examples of each: Physical contaminants primarily impact the physical appearance or other physical properties of water. Examples of physical contaminants are sediment or organic material suspended in the water of lakes, rivers, and streams from soil erosion.

Chemical contaminants are elements or compounds. These contaminants may be naturally occurring or man-made. Examples of chemical contaminants include nitrogen, bleach, salts, pesticides, metals, toxins produced by bacteria, and human or animal drugs. Biological contaminants are organisms in water. They are also referred to as microbes or microbiological contaminants. Examples of biological or microbial contaminants include presence of bacteria, viruses, protozoan, and parasites. Radiological contaminants are chemical elements with an unbalanced number of protons and neutrons resulting in unstable atoms that can emit ionizing radiation. Examples of radiological contaminants include cesium, plutonium, and uranium.

Drinking water may reasonably be expected to contain at least small amounts of some contaminants.

In an embodiment, present disclosure decreases biological contaminant in water to make it fit for drinking.

The types and concentrations of natural contaminates depend on the nature of the geological materials through which the groundwater flows and quality of the recharge water. Groundwater moving through sedimentary rocks and soils may pick up a wide range of compounds, such as magnesium, calcium, and chloride, arsenate, fluoride, nitrate, and iron; thus, the effect of these natural contaminations depends on their types and concentrations. The natural occurring elements present at unacceptable levels can contaminate water as well.

Other contaminants are man-made by-products of industry, and agriculture, including heavy metals like mercury, copper, chromium, lead, and hazardous chemicals, dyes and compounds like insecticides and fertilizers. Improper storing or disposing of household chemicals such as paints, synthetic detergents, solvents, oils, medicines, disinfectants, pool chemicals, pesticides, batteries, gasoline, and diesel fuel can lead to ground water contamination.

The microbial contaminants include pathogens like bacteria such as E. coli, viruses such as EMCV, and parasites such as microscopic protozoa and worms. These living organisms can be spread by human and animal wastes knowing or unknowingly.

Some contaminants can be easily identified by assessing color, odor, turbidity, and the taste of the water. However, most cannot be easily detected and require testing to reveal whether water is contaminated or not. Thus, the contaminants may result in unappealing taste or odor and staining as well as health effects.

"Water flow pump" is a machine used to increase the pressure of water to move it from one point to another. There are two basic types of water pumps: centrifugal and positive displacement. Both types are designed to move water from one place to another continuously. A centrifugal water pump uses a rotating impeller to move water into the pump and pressurize the discharge flow. In an embodiment, either type of water pump could be employed in this invention.

The term "sterilize", "sterilizing" and "sterilization" mean the killing or removal or reduction of microorganisms in a material or on an object.

Sterilization is a high-level of decontamination that destroys all microbial life, including highly resistant bacterial endospores. Disinfection in an intermediate level of decontamination, which eliminates virtually all pathogenic microorganisms, except for bacterial spores.

Sterilization refers to any process that removes, kills, or deactivates all forms of life (in particular referring to microorganisms such as fungi, bacteria, spores, unicellular, eukaryotic organisms such as plasmodium, etc.) and other biological agents like prions present in a specific surface, object or fluid, for example food or biological culture media. Sterilization can be achieved through various means, including heat, chemicals, irradiation, high pressure, and filtration. Sterilization is distinct from disinfection, sanitization, and pasteurization, in that those methods reduce rather than eliminate all forms of life and biological agents present. After sterilization, an object is referred to as being sterile or aseptic.

In an embodiment, sterilization can be achieved by physical and chemical methods. Physical methods comprise Heat (Dry and moist), sunlight, vibration, radiation, filtration.

Chemical methods comprise ethylene oxide, formaldehyde gas, peracetic acid, and glutaraldehyde.

The term "Sterilized water" is defined as water that has been treated to make the water fit for drinking purposes.

The term "biologically contaminated water" is defined as water contaminated by organisms. Examples of biological or microbial contaminants include bacteria, viruses, protozoan, and parasites. There are many sources of these pollutants. By controlling the relative humidity level in a home, the growth of some sources of biologicals can be minimized. If water is not cleaned properly, residents of a community can contract various illnesses. Viruses, bacteria, and parasites can enter a water supply unknowingly. All three of these species are pathogenic, or disease-causing.

The term "Magnetron" an electron tube for amplifying or generating microwaves, with the flow of electrons controlled by an external magnetic field. There are three types of magnetrons: negative resistance type, cyclotron frequency type, travelling wave or cavity type. Negative resistance magnetrons make use of negative resistance between two anode segments. Cyclotron frequency magnetrons depends upon synchronism amid an alternating component of electric field and periodic oscillation of electrons in a direction parallel to this field. Cavity type magnetrons depends upon the interface of electrons with a rotating electromagnetic field of constant angular velocity. Fixed-frequency CW magnetrons used extensively for industrial heating and microwave ovens. The operating frequencies are around 900 MHz and 2.5 GHz, although typical powers range from 300 W to 10 kW.

In an embodiment, excitation of an electrodeless lamp by transmitting microwaves is performed from a magnetron to an electrodeless lamp through a waveguide. To generate heat from the magnetron and the electrodeless lamp, the magnetron and the electrodeless lamp are simultaneously cooled by supplying cooling air from the blower to the magnetron and the electrodeless lamp.

In an embodiment, a magnetron is used to generate microwaves to excite the encapsulated chemicals of the electrodeless lamp.

In general, the magnetron power supply adopts a half-wave double voltage scheme and operates only for one period of (+) or (−) when using a typical 60 Hz power supply. In the present invention, the two magnetrons are operated in reverse phase to reduce the blanking time by complementary operation.

In an embodiment, using a microwave energy source as an example, a magnetron and a waveguide are coupled to the microwave cavity to excite a gas fill within the electrodeless bulb and produce ultraviolet radiation.

In an embodiment, one or more microwave generators, such as a magnetron, are connected to the interior of the microwave chamber through a waveguide. The magnetron supplies microwave energy to generate and maintain a plasma from a gas mixture enclosed in a plasma lamp. Plasma emits a characteristic spectrum of electromagnetic radiation, which is strongly influenced by spectral lines or photons having ultraviolet and infrared wavelengths.

The use of certain UV lamp systems requires very accurate UV light intensity. These uses are sensitive to changes in the intensity of UV light and require a substantially constant light intensity. Providing a substantially constant UV light intensity is a challenge. First, manufacturing tolerances associated with magnetrons have a significant effect on the output of each magnetron and are directly related to the intensity of the UV light. Magnetron manufacturers have power target values for magnetrons, for example about 3,000 W. However, due to manufacturing tolerances, the actual magnetron output may be lower or higher than the target value of 3,000 W. Some manufacturers do not provide a clear output value for each magnetron, but have a tolerance range for the magnetron. This introduces uncertainty with respect to the actual output of the magnetron used in the UV lamp system. Tolerance variations between magnetrons result in variations in the output of each magnetron, and differences in UV light intensity between different lamp systems.

The term "colony-forming unit (CFU or cfu)" is a measure of viable bacterial cells. In direct microscopic counts (cell counting using haemocytometer) where all cells, dead and living, are counted, but CFU measures only viable cells.

Counting with colony-forming units requires culturing the microbes and counts only viable cells, in contrast with microscopic examination which counts all cells, living or dead. The visual appearance of a colony in a cell culture requires significant growth, and when counting colonies it is uncertain if the colony arose from one cell or a group of cells. Expressing results as colony-forming units reflects this uncertainty.

The purpose of plate counting is to estimate the number of cells present based on their ability to give rise to colonies under specific conditions of nutrient medium, temperature, and time. Theoretically, one viable cell can give rise to a colony through replication. However, solitary cells are the exception in nature, and most likely the progenitor of the colony was a mass of cells deposited together. In addition, many bacteria grow in chains (e.g. Streptococcus) or clumps (e.g., Staphylococcus). Estimation of microbial numbers by CFU will, in most cases, undercount the number of living cells present in a sample for these reasons. This is because the counting of CFU assumes that every colony is separate and founded by a single viable microbial cell.

The term "Quartz" is a hard, crystalline mineral composed of silica. The atoms are linked in a continuous framework of $SiO_4$ silicon-oxygen tetrahedra, with each oxygen being shared between two tetrahedra, giving an overall chemical formula of $SiO_2$.

Fused quartz, fused silica or quartz glass is a glass consisting of almost pure silica (silicon dioxide, $SiO_2$) in amorphous (non-crystalline) form. This differs from all other commercial glasses in which other ingredients are added which change the glasses' optical and physical properties, such as lowering the melt temperature. Fused quartz, therefore, has high working and melting temperatures, making it less desirable for most common applications.

The terms fused quartz and fused silica are used interchangeably, but can refer to different manufacturing techniques, as noted below, resulting in different trace impurities. However fused quartz, being in the glassy state, has quite different physical properties compared to crystalline quartz. Due to its physical properties, it finds specialty uses in semiconductor fabrication and laboratory equipment, for instance.

Compared to other common glasses, the optical transmission of pure silica extends well into the ultraviolet and infrared wavelengths, so is used to make lenses and other optics for these wavelengths. Depending on manufacturing processes, impurities will restrict the optical transmission, resulting in commercial grades of fused quartz optimized for use in the infrared, or (then more often referred to as fused silica) in the ultraviolet. The low coefficient of thermal expansion of fused quartz makes it a useful material for precision mirror substrates.

Quartz exists in two forms, the normal α-quartz, and the high-temperature β-quartz, both of which are chiral. The transformation from α-quartz to j-quartz takes place abruptly at 573° C. (846 K; 1,063 F). Since the transformation is accompanied by a significant change in volume, it can easily induce fracturing of ceramics or rocks passing through this temperature threshold. There are many different varieties of quartz, several of which are semi-precious gemstones.

The term "Optical properties" of a material define how it interacts with light. The optical properties of matter include refractive index, dispersion, transmittance, and transmission coefficient, absorption, scattering, turbidity, reflectance, fluorescence, phosphorescence, photoluminescence, optical bistability, dichroism, birefringence etc.

The term "Glass" is a non-crystalline, often transparent amorphous solid that has widespread practical, technological, and decorative use in, for example, windowpanes, tableware, and optics. Glass is most often formed by rapid cooling (quenching) of the molten form; some glasses such as volcanic glass are naturally occurring. The most familiar, and historically the oldest, types of manufactured glass are "silicate glasses" based on the chemical compound silica (silicon dioxide, or quartz), the primary constituent of sand. Soda-lime glass, containing around 70% silica, accounts for around 90% of manufactured glass. The term glass, in popular usage, is often used to refer only to this type of material, although silica-free glasses often have desirable properties for applications in modern communications technology. Some objects, such as drinking glasses and eyeglasses, are so commonly made of silicate-based glass that they are simply called by the name of the material.

The "Sapphire" is a precious gemstone, a variety of the mineral corundum, consisting of aluminium oxide ($\alpha$-$Al_2O_3$) with trace amounts of elements such as iron, titanium, vanadium, or magnesium. It is typically blue, but natural "fancy" sapphires also occur in yellow, purple, orange, and green colors; "parti sapphires" show two or more colors. Red corundum stones also occur, but are called rubies not sapphires. Pink-colored corundum may be classified either as ruby or sapphire depending on locale.

The "noble gases" (historically also the inert gases or rare gases; sometimes referred to as aerogens) make up a class of chemical elements with similar properties; under standard, they are all odorless, colorless, monoatomic gases with very low chemical reactivity. The six naturally occurring noble gases are helium (He), neon (Ne), argon (Ar), krypton (Kr), xenon (Xe), and the radioactive radon (Rn).

The term "UV reflector" means an optical element that functions to direct reflected UV radiation onto a substrate according to a predetermined pattern.

In an embodiment, reflectivity of UV reflector ranges approximately from 20% to 99% at 315-400 nm. Reflectivity may be 20%, 30%, 40%, 50%, 60%, 70%, 80%, 90% or 99%.

In an embodiment, reflectivity of UV reflector ranges approximately from 20% to 99% at 280-315 nm. Reflectivity may be 20%, 30%, 40%, 50%, 60%, 70%, 80%, 90% or 99%.

In an embodiment, reflectivity of UV reflector ranges approximately from 20% to 99% at 100-280 nm. Reflectivity may be 20%, 30%, 40%, 50%, 60%, 70%, 80%, 90% or 99%.

In an embodiment, reflectivity of UV reflector ranges approximately from about 20% to about 99% at 100-400 nm. Reflectivity may be 20%, 30%, 40%, 50%, 60%, 70%, 80%, 90% or 99% at 100-400 nm.

In particular, the UV reflector can be a coated optical element having a wavelength selective coating that preferentially directs UV light to the substrate. Wavelength selective coatings are generally multilayer thin films of dielectric materials, which are applied using vacuum deposition techniques such as physical vapor deposition or chemical vapor deposition well known to those skilled in the art. The optical element is described in detail in U.S. Pat. No. 8,488,103B2, which is incorporated herein in its entirety.

The reflector geometry determines the pattern of radiation that illuminates the substrate. The reflector is typically made in the shape of a part of a conic curve such as a parabola, ellipse, hyperbola, circle obtained by cutting a cone in a plane. In general, an elliptical reflector is used to focus UV radiation onto a substrate that is placed at or near the reflector's focal point. An elliptic reflector has the property of reflecting a light beam created from a light source placed at one focus point of the ellipse once before passing through the other focal point. An elliptical reflector with a plasma bulb axially along one focal point, for example, will provide focused linear radiation to a substrate at the second focal point. Some ultraviolet lamp applications, on the other hand, necessitate consistent lighting or radiation density over a vast region of the substrate. A hyperbolic reflector with a radiation source at the hyperbolic focus would be perfect for such applications.$ In an embodiment, UV reflectors are typically specular reflectors with shapes that are elliptical and focusing or parabolic and defocusing. The elliptical reflectors have a high intensity UV source at one focus of an ellipse with the emitted UV rays focused at the second focus on the ellipse.

In an embodiment, these UV reflectors are also generally made of an anodized aluminum material or a dichroic multiple thin film material, with each material having its own reflective properties. The anodized aluminum reflectors are specular reflectors with a reflectivity of about 70% at 250 nm and about 20% at 200 nm. These reflectors do not transmit the UV spectrum of a lamp to an exposed surface without changing the spectrum of UV radiation. As a result, the entire spectrum of UV radiation is not transmitted and applied to the surface of exposure.

An example of an elliptical specular reflector is made by Fusion UV Systems, Inc. for use in microwave lamps. The Fusion UV reflector has a reflectivity that ranges approximately from 20% at 200 nm to 70% at 240-270 nm and 86% at visible wavelengths. It also has an elliptical shape with a bulb at the first focus of the ellipse. The second focus of the ellipse is a few inches outside of the lamp housing, though in some applications it is intentionally de-focused to create a more uniform flux outside the housing.

The Fusion UV elliptical specular reflector is made of Alzak, an anodized aluminum material. The reflector forms a portion of a microwave cavity that couples microwave energy into a high intensity UV bulb lamp, which is linear and electrodeless. The light exits the cavity through a metallic screen, usually made of fine tungsten wire so it contains the microwaves and allows light to pass through with about 5 to 10% absorption due to the wires. The reflector incorporates slots for coupling the microwave energy from the magnetron into the lamp cavity formed by the reflector and metallic screen. Other holes are placed in the reflector to allow cooling air to flow through the reflector, across the bulb and out of the cavity.

In an embodiment, providing a plate to separate the liquid stream from the headspace has several advantages. The presence of the plate to separate the liquid stream from the headspace can prevent liquid from splashing up into the headspace and out of the reactor. In addition to this, if the reactor comprises means for introducing microwaves and/or ultraviolet energy then the plate can be used as a microwave/ultraviolet reflector. Using the plate as a microwave and/or ultraviolet reflector in this way prevents microwaves and/or ultraviolet being absorbed by the bulk liquid in the liquid stream, and keeps the microwaves and/or ultraviolet energy in the headspace so that the at least one rotating contactor may be exposed to more microwave and/or ultraviolet radiation, hence increasing the effect that the microwaves and/or ultraviolet energy has on the treatment of the liquid stream.

UV transmitting material allows UV light to transmit.

Some of the most common UV transmitting materials include UV Fused Silica, Calcium Fluoride ($CaF_2$), and Sapphire. UV Fused Silica is the most used UV substrate due to its affordability, accessibility, and easy fabrication compared to many other UV-transmitting materials. UV Fused Silica also transmits wavelengths down to 193 nm and offers a low coefficient of thermal expansion. $CaF_2$ has a low refractive index, low axial, and radial birefringence, and transmits wavelengths down to 180 nm, making it suitable for UV excimer laser applications. Sapphire is ideal for use in harsh environments because of its extreme surface hardness, high thermal conductivity, high dielectric constant, and strong resistance to a variety of chemical acids or alkalis. With extreme resistance to UV darkening, high quality sapphire is often used in high power UV applications and some types of optical Sapphire transmits down to 150 nm.

UV transmittance of these materials ranges from about 20% to about 99%. It may be about 20%, 30%, 40%, 50%, 60%, 70%, 80%, 90%, 99%, or more.

In an embodiment, UV transmittance of UV fused silica ranges from about 20% to about 99%. It may be about 20%, 30%, 40%, 50%, 60%, 70%, 80%, 90%, 99%, or more.

In an embodiment, UV transmittance of calcium fluoride ($CaF_2$) ranges from about 20% to about 99%. It may be about 20%, 30%, 40%, 50%, 60%, 70%, 80%, 90%, 99%, or more.

In an embodiment, UV transmittance of sapphire ranges from about 20% to about 99%. It may be about 20%, 30%, 40%, 50%, 60%, 70%, 80%, 90%, 99%, or more.

The invention is illustrated through one or combination of embodiments.

Embodiments of the present disclosure help people gain access to clean drinking water in the US and around the world. The proposed embodiments provide a safe and inexpensive method of purifying water. The proposed embodiments cost about $1 per month and are therefore affordable to most people on the planet.

Figure 1B:
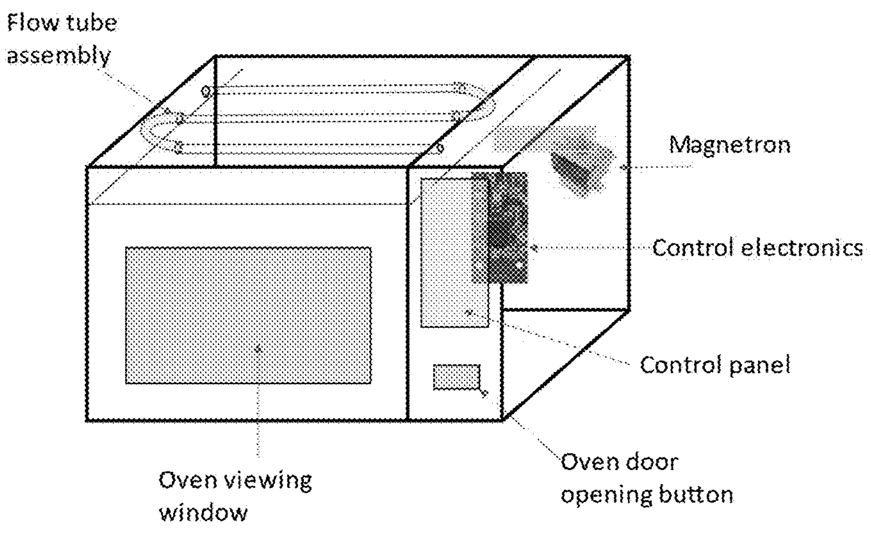
FIG. 1B shows a perspective view of a microwave oven modified to include a flow tube according to an embodiment.

FIG. 1A illustrates an apparatus 100 for purifying water using an electrodeless UV-emitting bulb 102. FIG. 1B illustrates a perspective view of a microwave oven modified to include a flow tube in a tray compartment according to an embodiment. Referring to FIGS. 1A and 1B, the electrodeless UV-emitting bulb 102 is operable to absorb microwave radiation and subsequently to emit ultraviolet (UV) radiation. The apparatus 100 further includes a first container 104, a first pipe 106, a water flow pump 108, a second pipe 110, a microwave oven 112 modified to receive a flow tube (UV-I) housed in the tray 114 having the electrodeless UV-emitting bulb 102 therein, a third pipe 116, and a second container 118. The microwave oven 112 has a front side door 120, a back side 122, a left side 124, a right side 126, a top side 128, and a bottom side 130. The sides 120, 122, 124, 126, 128, 130 of the microwave oven form an interior space 132 for receiving and irradiating the flow tube 114 (housed within a tray assembly) having the electrodeless UV-emitting bulb 102 therein. Electronics 134, a magnetron 136, and wave guides 138 are located adjacent to the front side door 120 proximal the right side 126. A first aperture 140 is formed in the left side 124 of the microwave oven 112 and a second aperture 142 is formed in the right side 126 of the microwave oven 112. The second pipe 110 is fitted to the flow tube 114 proximal the first aperture 140. The third pipe 116 is fitted to the flow tube 114 proximal the second aperture 142. The third pipe 116 is configured to empty the purified water into the second container 118.

In an embodiment, in response to pressing required keys on a keypad 144, control signals in the electronics 134 operate the magnetron 136 for a period to cause the magnetron 136 to emit microwave radiation into the interior space 132 via the wave guide 138. In an embodiment, the control signals in the microwave oven 112 that cause the electronics 134 that operate the magnetron 136 may concurrently operate the water flow pump 108.

In operation, the biologically contaminated water is pumped at a pre-determined flow rate by the water flow pump 108 into the microwave oven interior space 132 via the first pipe 106, the second pipe 110, and the first aperture 140 therebetween. The magnetron 136 is operated in response to keys pressed on the keypad 144 via the intervening electronics 134. The magnetron 136 emits a first portion and a second portion of microwave radiation toward the flow tube 114 comprising the electrodeless UV-emitting bulb 102. The electrodeless UV-emitting bulb 102 absorbs a portion of microwave radiation.

Figure 5:
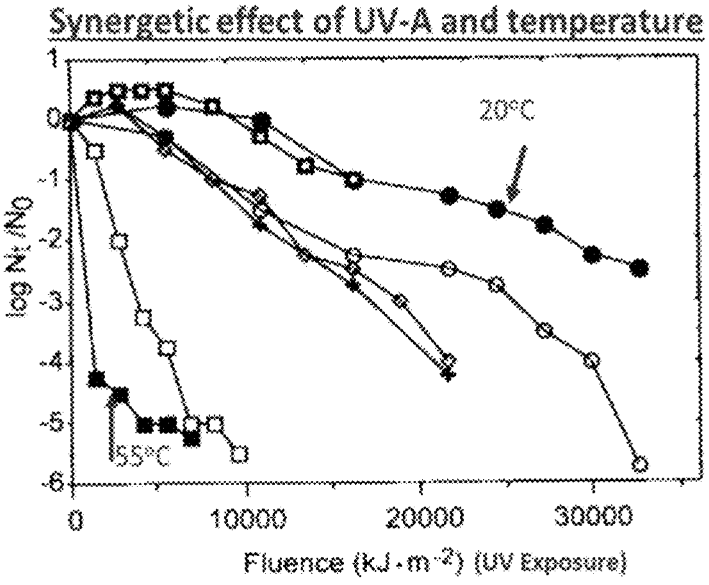
FIG. 5 shows a graph of synergistic effect of UV and temperature to decrease EMCV density.

In response to absorbing the first portion of microwave radiation, the temperature of the water flowing through the flow tube 114 rises to a pre-determined temperature (preferably to 55° C.) as suggested by the synergistic effect. Concurrently, the second portion of the microwave radiation when absorbed by the mercury vapor within the electrodeless UV-emitting bulb 102, is excited to a plasma state causing the electrodeless UV-emitting bulb 102 to ignite (sustain the plasma) and emit ultraviolet (UV) radiation. The emitted UV radiation is directed towards the biologically contaminated and heated water flowing in the flow tube 114. The biologically contaminated water absorbs the ultraviolet radiation. Per the synergistic effect, as the temperature of water is increased to 55° C., the required amount of UV radiation to sterilize the water is reduced significantly (FIG. 5). Leveraging this synergistic effect of UV and heat, this UV radiation sterilizes the biologically contaminated water, heated to a predetermined temperature, preferably to 55° C., flowing in the flow tube 114 to a predetermined level of sterilization. The sterilized water further flows through the third pipe 116 through the second aperture 142 in the microwave oven 112 into the second container 118.

In an embodiment, the flow rate of the biologically contaminated water through the flow tube 114 is selected to provide the first portion of microwave radiation to heat the biologically contaminated water to the predetermined temperature while leaving at least a minimum amount of microwave radiation to ignite the electrodeless UV-emitting bulb 102.

Figure 2:
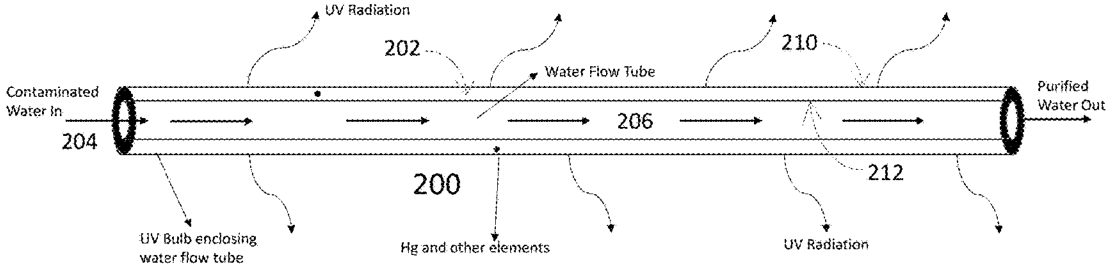
FIG. 2 illustrates, a flow tube/electrodeless bulb combination (UV-X) with the electrodeless UV-emitting bulb disposed on the outside of the flow tube wherein water flows through the interior of the flow tube.

FIG. 2 illustrates, in one embodiment, a flow tube/electrodeless bulb combination 200 (UV-X) with the electrodeless UV-emitting bulb 202 disposed on the outside of the flow tube 204 wherein water flows through the interior 206 of the flow tube 204. More particularly, the electrodeless UV-emitting bulb 202 is longitudinally disposed within the flow tube 204 and comprises an outer surface 210 in contact with an inner surface 212 of the flow tube 204 configured to form an interior space 206 through which water flows.

In an embodiment, the flow tube consists of two sections—internal section (206) and external section (202). Both these sections are physically isolated from each other. This flow tube is fabricated using fused silica (quartz). Other UV transmitting and temperature resistant (with melting point exceeding 500° C.), such as sapphire, can also be used. This tube is designed such that water flows through the internal section (202) when connected to a pipe carrying water. The external section (202) contains the required amount of mercury and other gases to form a light bulb that can generate UV radiation when excited by microwave energy inside a microwave oven. One end of the flow tube UV-x is connected to the water inlet and the other end to the water outlet. The entire flow tube assembly is placed inside a microwave oven. As the oven is powered up, contaminated water begins to flow through the internal section of the tube from the inlet and simultaneously, UV radiation is generated from the external section of the tube. Some amount of generated microwave energy is used to ignite the UV bulb, while the remaining microwave energy is used to heat the water flowing in the tube. Due to the design of the tube, some amount of UV radiation gets absorbed by the heated water to disinfect whereas the reminder of UV radiation gets radiated outwards and thus does not get absorbed by water (wasted). Hence the efficacy of this design is not optimum.

In one embodiment, another flow tube design with some modification to the proposed UV-x design can also be used. In this design, a coating layer with similar physical, electrical and optical property as quartz can be applied on the external surface (210). The thickness of this can be approximately 10-50 microns. Several companies offer such a coating. An example of such a coating is called Heraeus Reflective Coating (HRC®). This coating has similar property as the quartz substrate on which it is deposited. This additional layer allows the microwave energy to pass through it that generates UV radiation and heats water simultaneously like the UV-x. The additional coating on the external surface, does not allow the UV radiation to radiate outwards and reflects them inwards, towards the heated water. Thus, all the UV radiation is absorbed effectively and increases the efficacy of the design.

In an embodiment, a reflector is applied on the external surface of the flow tube to direct the transmission of UV light inside the tube. Accordingly, the preferred reflector of such a system selectively reflects and transmits radiation as a function of wavelength. In particular, the reflector can be a coated optical element having a wavelength selective coating that preferentially directs UV light to the substrate. Wavelength selective coatings are generally multilayer thin films of dielectric materials, which are applied using vacuum deposition techniques such as physical vapor deposition or chemical vapor deposition well known to those skilled in the art.

In an embodiment, reflector geometry determines the pattern of radiation. The reflector is typically made in the shape of a part of a conic curve such as a parabola, ellipse, hyperbola, circle obtained by cutting a cone in a plane. In general, an elliptical reflector is used to focus UV radiation onto a substrate that is placed at or near the reflector's focal point. An elliptic reflector has the property of reflecting a light beam created from a light source placed at one focus point of the ellipse once before passing through the other focal point. An elliptical reflector with a plasma bulb axially along one focal point, for example, will provide focused linear radiation to a substrate at the second focal point. Some ultraviolet lamp applications, on the other hand, necessitate consistent lighting or radiation density over a vast region of the substrate. A hyperbolic reflector with a radiation source at the hyperbolic focus would be perfect for such applications.

Figure 3:
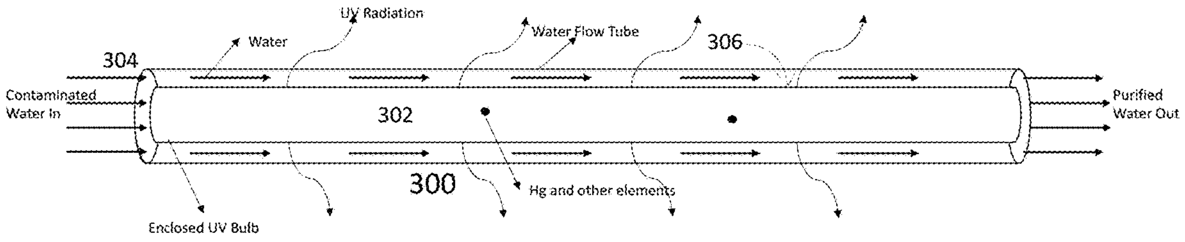
FIG. 3 illustrates a flow tube/electrodeless bulb combination (UV-I) with the electrodeless UV-emitting bulb disposed on the inside of the flow tube wherein water flows between electrodeless UV-emitting bulb and the flow tube.

FIG. 3 illustrates, in one embodiment, a flow tube/electrodeless bulb combination (UV-I) 300 with the electrodeless UV-emitting bulb 302 disposed on the inside of the flow tube 304 wherein water flows between electrodeless UV-emitting bulb 302 and the flow tube 304. More particularly, the electrodeless UV-emitting bulb 302 is longitudinally disposed within the flow tube 304 and is configured to be in contact with the water flowing on an outer surface 306 of the at least one electrodeless UV-emitting bulb 302.

In one embodiment, the flow tube consists of two sections—internal section (302) and external section (306). Both these sections are physically isolated from each other. This flow tube is fabricated using fused silica (quartz). Other UV transmitting and temperature resistant (with melting point exceeding 500° C.), such as, Sapphire can also be used. This tube is designed such that water flows through the external section (306) when connected to a pipe carrying water. The internal section (302) contains required amount of mercury and other gases as needed, to form a light bulb that can generate UV radiation when excited by microwave energy inside a microwave oven. One end of the flow tube UV-i is connected to the water inlet and the other end to the water outlet. The entire flow tube assembly is placed inside a microwave oven. When the oven is powered up, contaminated water begins to flow through the external section of the tube from the inlet and simultaneously, UV radiation is generated from the internal section of the tube. Some amount of generated microwave energy is used to ignite the UV bulb, while the remaining microwave energy is used to heat the water flowing in the tube. Due to the design of the tube, all the UV radiation gets absorbed by the heated water to disinfect. Thus, the efficiency of this design is significantly better than UV-x. Though this design is inherently more efficient, it requires careful balance of water amount and flow rate. Since water is an excellent absorber of microwave energy, if too much water is allowed to flow through the tube, most or all generated microwave energy will be absorbed by the water that is flowing through the external section as the microwave energy will first encounter the water. Thus, very little or no microwave energy will be left for heating the mercury and other gases to generate UV radiation. Care must be taken to allow only an optimum amount of water to flow through the tube for effective purification.

In one embodiment, the electrodeless UV-emitting bulb 102 is made of one of sapphire, quartz, or glass.

In an embodiment, the flow rate of the water is adjustable to take advantage of further sterilization due to a rise in temperature of the water in response to excitation of microwaves emitted within the microwave interior space 132 in addition to that provided by the UV radiation emitted by the electrodeless UV-emitting bulb 102. The flow rate of water is selected such that the volume of water flowing through the flow tube 114 provides adequate microwave radiation to both heat the biologically contaminated water to a desired temperature while also providing sufficient microwave radiation for bulb ignition. If proper selection of the flow rate is not performed, then almost all of the microwave radiation could be absorbed by the water and none would be left for bulb ignition.

Figure 4:
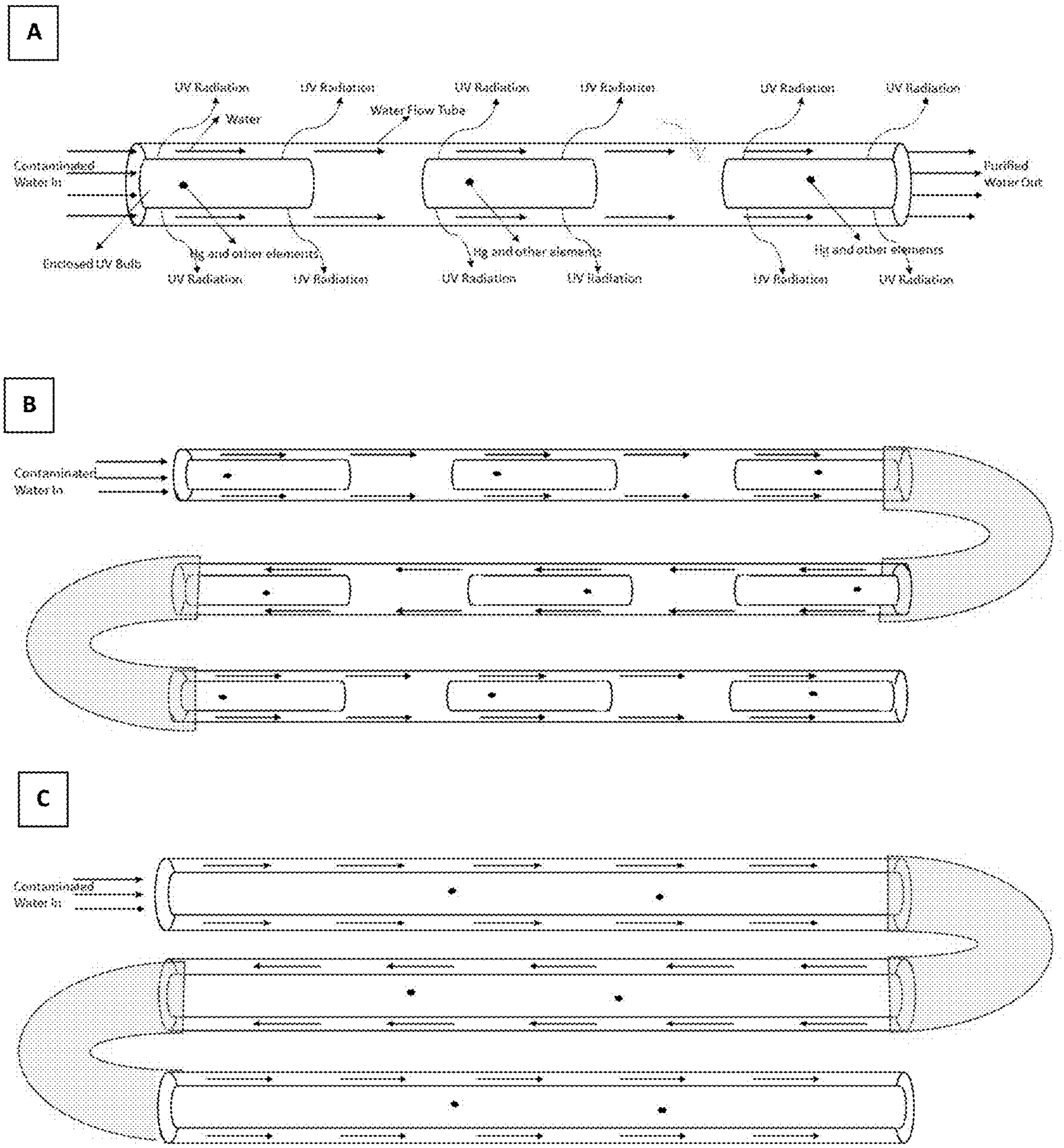
FIG. 4 shows different configurations of UV-I flow tubes according to an embodiment.

FIG. 4A to 4C show several configurations of UV-I flow tubes according to an embodiment.

In another embodiment as shown in FIG. 4A, the UV generating portion of the tube can be split into several smaller sections to allow more water to slow through the tube. Care must be taken to ensure that the generated UV radiation is adequate to disinfect the contaminated water. If more volume of water is needed to be purified, several sections of the tube as described in FIG. 4A, connected by soft, microwave compatible, plastic water pipes, as shown in FIG. 4B, can be placed inside the microwave oven. This arrangement will allow more water to flow through while simultaneously getting exposed to more microwave energy and generated UV radiation within the oven. This will make the disinfection process more effective.

In yet another embodiment, a continuous UV generating section can be used (FIG. 4C) that will result in higher volume of water purification.

FIG. 5 shows a graph of E. coli. Count as a function of UV exposure for varying water temperature. As can be seen in the graph, the plot of points for a water temperature of 20° C. shows a much higher level of resulting biological contamination as compared to the points corresponding to a water temperature of 55° C. Thus, there exists a synergistic effect of the application of both UV radiation and microwave radiation to the biologically contaminated water to purify the water. To leverage the synergetic effect of heat and UV, two separate flow tubes, UV-I (202) and UV-X (302) with an integrated electrode-less bulb to generate UV were designed (FIG. 2 and FIG. 3). The UV-I 202 design with the electrode-less bulb 302 generating UV on the interior of the flow tube 304 and water flowing on the exterior of the electrode-less bulb 302 and the interior of the flow tube the 304 maximizes UV absorption in flowing water. The flow rate of water flowing through the UV-I (202) was optimized so that adequate microwave radiation was delivered to heat the water to a desired temperature while leaving at least a minimum amount of microwave radiation for bulb ignition.

FIG. 5 shows inactivation of EMCV by UV-A at various temperatures (laboratory experiments).

Experimental Results

Verification of the efficacy of embodiments of the method of the present disclosure involved experimentally purifying 8 Liters of water, typically consumed by a family of four daily. Referring again to FIGS. 1 and 3, to conduct the experiment with adequate margin, 16 Liters (L) of tap water were collected in two 20 L containers (A and B) 104. Two concentrations (100 uL and 250 uL) of Luria Broth and E. Coli were added to the containers 104 and mixed thoroughly. A small amount of contaminated water was then pipetted from each container 104 and placed in 2 different agar plates that served as a control. Agar plates were placed inside an incubation furnace for 24 hours at 35° C. After the incubation period, Colony-forming Unit (CFU) counts were recorded for both samples.

Container-A 104, with the 100 uL of Luria broth and E. Coli mixture of contaminated water, was pumped by the water flow pump 108 into the microwave oven 112 containing a UV-I 300. Using the water flow pump 108, the flow rate of the contaminated water was varied from 3 Liters/10 minutes to 16 Liters/10 minutes. As the contaminated water flowed through the UV-I 300, the temperature of the water increased while the contaminated water was simultaneously exposed to UV radiation from the UV-emitting electrodeless bulb 302. Finally, the exposed water was collected in the second container 116. These steps were repeated for several different water flowrates. Immediately after the exposure, a thermometer was used to record the water temperature.

A small amount of the exposed water for each different flow rate was put into a separate agar plate and incubated at 35° C. for 24 hours. Then the CFU count was recorded. The same procedure was repeated for Container-B 104 with the 250 uL of Luria Broth and E. Coli mixture.

Figure 6A:
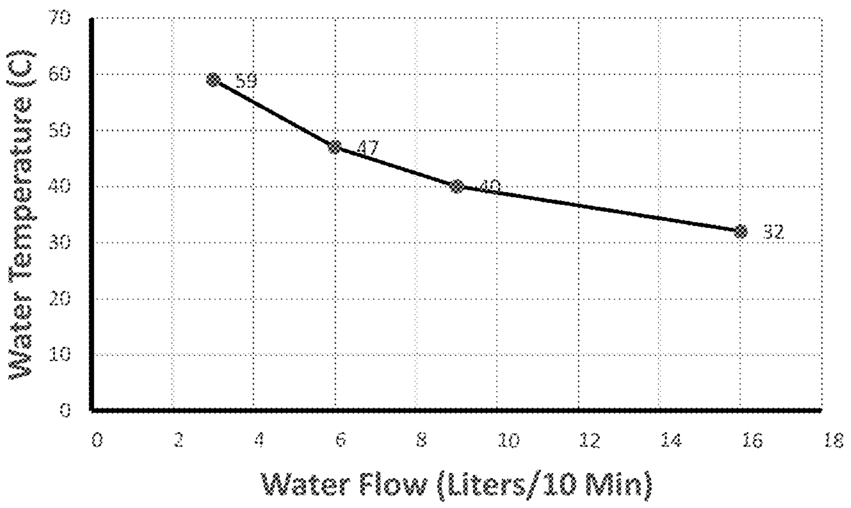
FIG. 6A shows a graph of water flow rate vs water temperature for a mixture of 150 μL of Luria Broth and E. Coli.
Figure 6B:
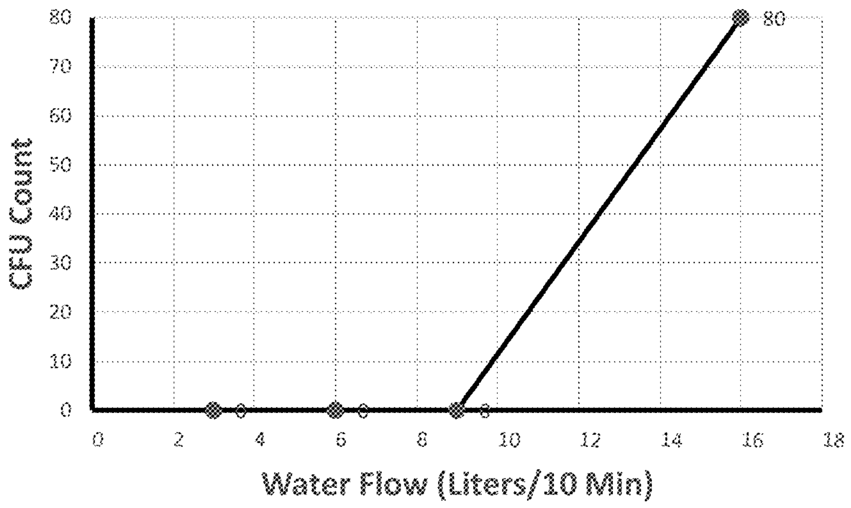
FIG. 6B shows a graph of water flow rate vs CFU Count for a mixture of 150 μL of Luria Broth and E. Coli.
Figure 7A:
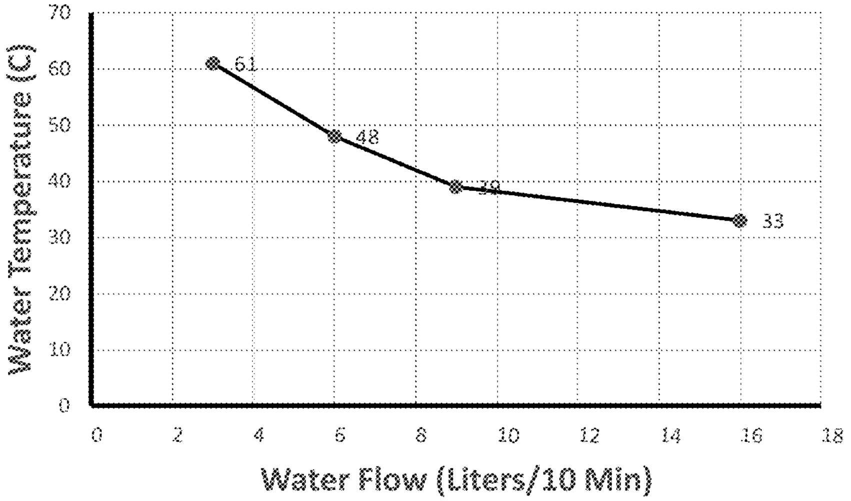
FIG. 7A shows a graph of water flow rate vs water temp for a mixture of 250 μL of Luria Broth and E. Co/i.
Figure 7B:
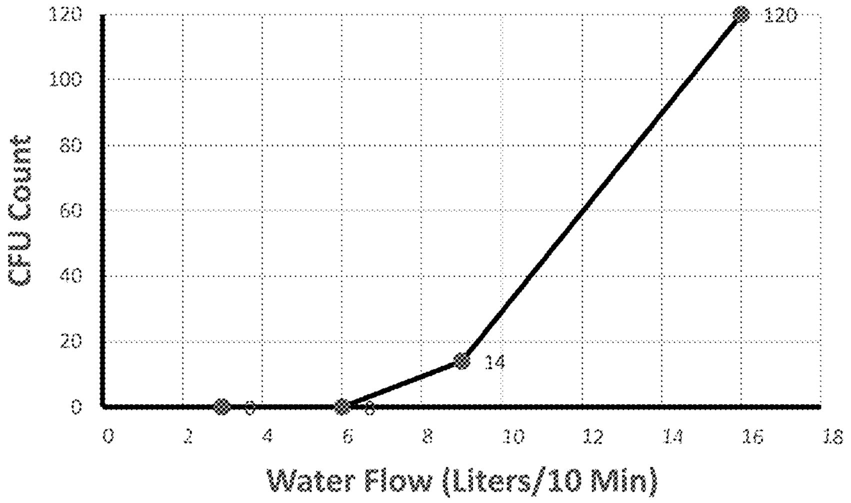
FIG. 7B shows a graph of water flow rate vs CFU Count for a mixture of 250 μL of Luria Broth and E. Co/i.

To analyze the data, the water temperature and CFU count were summarized as a function of the flow rate in Tables 1 and 2 for both water samples (Mixture-A and Mixture-B) and plotted on the graph shown in FIG. 6A and FIG. 6B for 150 uL of Luria Broth and E. Coli mixture, and FIGS. 7A and 7B for 250 uL of Luria Broth and E. Coli mixture, respectively. The independent variables were the water flow rate and the E. Coli and Luria broth mixture. The dependent variables were the water temperature and CFU count after exposure, respectively.

TABLE 1

Data collected for Mixture-A (150 uL of Luria Broth and *E. Coli* mixture)

| Water flow (Liters/10 min) | Water Temperature (° C.) | CFU count |
|---|---|---|
| 0 (no flow) | 20 | 600 |
| 3 | 59 | 0 |
| 6 | 47 | 0 |
| 9 | 40 | 0 |
| 16 | 32 | 80 |

TABLE 2

Data collected for Mixture-B (250 μL of Luria Broth and *E. Coli* mixture)

| Water flow (Liters/10 min) | Water Temperature (° C.) | CFU count |
|---|---|---|
| 0 (no flow) | 21 | 3700 |
| 3 | 61 | 0 |
| 6 | 48 | 0 |
| 9 | 39 | 14 |
| 16 | 33 | 120 |

As the flow rate through the UV-I (300) increased from 3 Liters/10 minutes to 16 Liters/10 minutes, the water temperature decreased from 59° C. to 32° C. for Mixture-A and 61° C. to 33° C. for Mixture-B. For Mixture-A, the CFU Count remained at 0 for flow rates of 3, 6, and 9 Liters/10 Minutes, but increased to 80 CFU at 16 Liters/10 Minutes (see FIGS. 6A and 6B). For Mixture-B, flow rates of 3 Liters/10 Minutes and 6 Liters/10 Minutes had a CFU Count of 0, but at 9 Liters/10 minutes CFU count increased to 14 and at 16 Liters/10 minutes CFU count increased to 120 (See FIGS. 7A and 7B).

As expected, with increased flow rates, water temperature decreased since the contaminated water was exposed to microwave radiation for less time. As per the synergetic effect (see FIG. 5), for water temperatures greater than 55° C., the required UV-A radiation was much lower to reach a 3 log reduction in CFU count. For higher flow rates, the temperature did not reach 55° C., which resulted in a higher amount of UV-A radiation required to purify the water completely. This is evident in that at 16 Liter/10 Minutes flow rate of Mixture-A, a non-zero CFU Count was measured. However, for Mixture-B, for the flow rate of 9 Liters/10 minutes (temperature of 39° C.), anon-zero CFU count was recorded. Even though for 150 uL at 9 Liters/10 minutes the temperature was only 40° C., the CFU count was still 0 since a lower mixture of E. Coli (only 100 uL) was added to the water.

As hypothesized above, the synergetic effect of heating the water and exposing the water to UV radiation will kill the biological contaminants, resulting in 0 or low CFU count. As shown, for Mixture-A, the CFU count was 0 for flow rates 3, 6, and 9 Liters/10 minutes, but increased to 80 CFU at 16 Liters/10 minutes. For Mixture-B, flow rates of 3 and 6 Liters/10 minutes had a CFU count of 0, but at 9 Liters/10 minutes and 16 Liters/10 minutes, the CFU count was 14 and 120 respectively. As expected, with increased flow rates the water temperature decreased since water was exposed to microwave radiation for less time. As per the synergetic effect, for water temperatures lower than 55° C., the required amount of UV-A radiation is much higher to reach 3 log reduction in CFU Count. For higher flow rates, the temperature did not reach 55° C., thus requiring higher amounts of UV-A radiation to purify the water completely. Although the experiments were limited to E. Coli as the biological impurity, embodiments of the method can be extended to other commonly found impurities in water, such as, algae, protozoa, pathogens, bacteria, viruses, microbes, and parasites along with their cysts (eggs).

Figure 8:
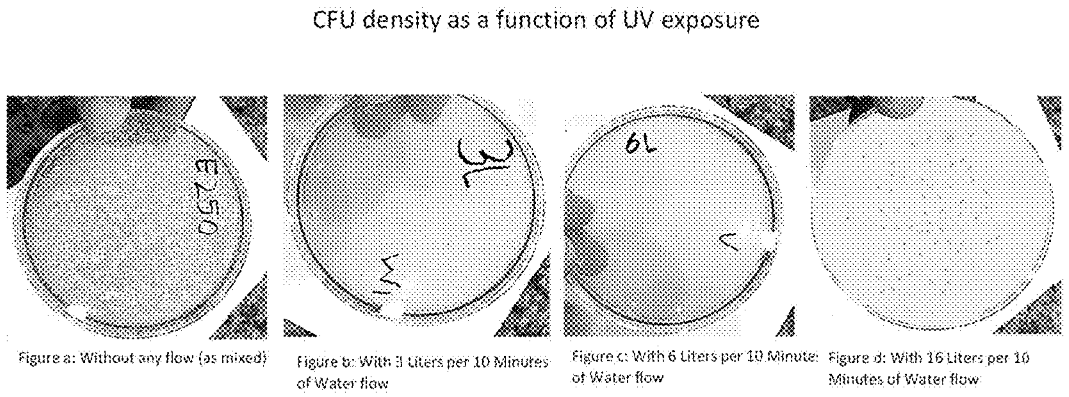
FIG. 8 shows growth of E. coli colonies on the LB agar plate.
Figure 9:
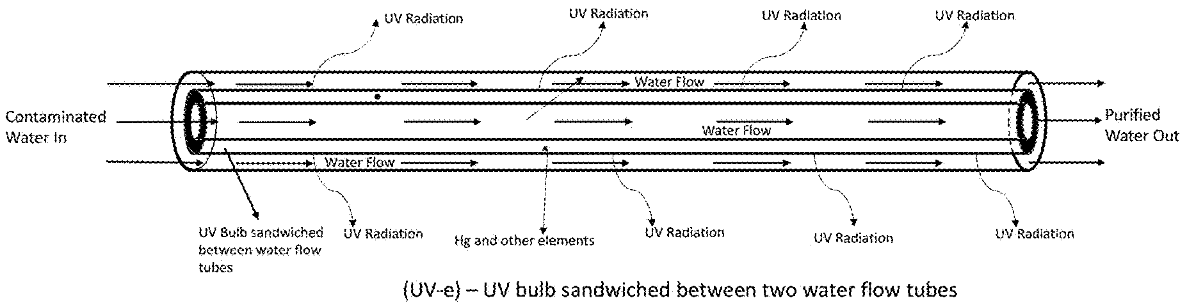
FIG. 9 shows UV bulb sandwiched between two water flow tubes (abbreviated as UV-e).

Conclusions can be drawn as follows from the experiments outlined above. For the designed flow tube containing a UV generating electrode-less bulb (UV-I 300) placed in a microwave oven, as the water flows at a given flow rate, the temperature of water will increase to 55° C. while being exposed to UV radiation. The temperature and UV exposure synergetic effect removes all biological impurities from the water which can be verified by CFU counts with the Agar plate technique. With increasing water flow rates beyond 9 Liters/10 minutes (FIGS. 6 and 7) for mixture A and 6 Liters/10 minutes (FIGS. 8 and 9) for mixture B, the temperature of water will be lower and the effectiveness of the method to kill the biological impurities will be reduced. As the flow rate exceeds a certain maximum value, the method will no longer be effective in killing biological impurity.

In an embodiment, the means for introducing microwave energy comprises one or more of a continuous magnetrons, a pulsed magnetron, a solid state power device or any combinations thereof.

In an embodiment, plate housed inside the microwave oven can be used as UV reflector.

In an embodiment, the invention made it possible to cook and purification of water at the same time.

In an embodiment, electrodeless UV emitting bulb generate Ultraviolet C (UVC) radiation and it can be generated using an electrodeless bulb filled with Mercury.

It is to be understood that modifications may be made to the embodiments of the invention herein which do not exceed the scope of the appended claims and modified forms of the present invention done by others skilled in the art to which the embodiments pertain will be considered infringements of this invention when those modified forms fall within the claimed scope of this invention.

All references, including granted patents and patent application publications, referred herein are incorporated herein by reference in their entirety.

US20090120882A1—Device for Treating Fluids, Especially Water Sterilization, Comprising an Electrodeless Gas Discharge Lamp U.S. Ser. No. 10/689,275B2—Rotating contactor reactor U.S. Pat. No. 7,794,673B2—Sterilizer U.S. Pat. No. 8,018,130B2—Low-pressure mercury vapor discharge lamp with amalgam U.S. Pat. No. 5,342,779A— Photochemically enhanced microbial degradation of environmental pollutants U.S. Pat. No. 4,563,282A—Wastewater treatment plant and inethodUS20180043345A1—Ion-exchange membrane with multi-layered support substrate—Google Patents US20050115498A1—Reflector for UV curing systems

What is claimed is:

1. An apparatus comprising:

a microwave oven having an interior space;

at least one flow tube assembly disposed in the interior space of the microwave, and comprising of at least two sections comprising a first section and a second section that are physically isolated from each other, the said flow tube assembly comprising a fused silica or a UV transmitting material and having a melting point exceeding 500° C., the first section comprising a first flow channel comprising a first inlet and a first outlet, and the second section comprising a light bulb that generates UV radiation; wherein the light bulb comprises an electrodeless UV-emitting bulb, wherein the first section is concentrically outside the second section such that the first flow channel for a liquid is formed outside the electrodeless UV-emitting bulb;

wherein an external surface of the flow tube assembly comprises a UV-reflector, wherein when the microwave oven is powered up:

(i) the microwave oven generates microwave energy, (ii) the liquid flows through the first flow channel, a first portion of the microwave energy heats the liquid flowing through the first flow channel at a temperature, and (iii) a second portion of the microwave energy ignites the light bulb and UV radiation is generated from the light bulb, (iv) the liquid in the flow tube assembly is heated to the temperature equal or more than 35° C. at an exit of the microwave oven, and (v) sterilizes the liquid exiting the microwave oven such that all microbial life is destroyed.

2. The apparatus of claim 1, wherein the liquid contains biologically contaminated water and the microwave oven heats the biologically contaminated water to the temperature in a range of 35° C. to 60° C.

3. The apparatus of claim 2, further comprising:

a first container for receiving the biologically contaminated water;

a first pipe in fluid communication with the first container;

a water flow pump in fluid communication with the first pipe;

a second pipe in fluid communication with the water flow pump and a first side of the at least one flow tube assembly;

a third pipe in fluid communication with a second side of the at least one flow tube assembly; and a second container in fluid communication with the third pipe for receiving a sterilized water.

4. The apparatus of claim 3, wherein the second pipe is fitted to one side of the at least one flow tube assembly through a first aperture located in a first side of the microwave oven.

5. The apparatus of claim 3, wherein the third pipe is fitted to one side of the at least one flow tube assembly through a second aperture located in a second side of the microwave oven.

6. The apparatus of claim 3, wherein the water flow pump is configured to operate concurrently with delivering of the first portion of the microwave energy and the second portion of the microwave energy.

7. The apparatus of claim 6, wherein the biologically contaminated water has 3700 or fewer CFU units of E. coli incubated on Luria broth at 35° C. for 24 hours, and the microwave in a powered state treats the biologically contaminated water flowing with a flow velocity less than 0.9 L/min in the first section, such that a treated water has equal or less than 14 CFU of E. coli.

8. The apparatus of claim 1, wherein an external surface of the flow tube assembly is coated with a coating composition having a physical, an electrical and an optical property as that of quartz.

9. The apparatus of claim 8, wherein a thickness of the coating composition on the external surface is about 10 microns to about 50 microns.

10. The apparatus of claim 1, wherein a source of microwaves in the microwave oven is a magnetron.

11. The apparatus of claim 1, wherein the UV transmitting material has more than 70% UV transmittance at a wavelength range of about range from 100 nm to about 400 nm.

12. The apparatus of claim 1, wherein the at least one flow tube assembly further comprises a third section comprising a second flow channel comprising a second inlet and a second outlet.

13. The apparatus of claim 12, wherein the second section is interposed between the first section and the third section.

14. The apparatus of claim 12, wherein an inlet bifurcates into the first inlet and the second inlet, and an outlet bifurcates into the first outlet and the second outlet.

15. The apparatus of claim 1, wherein the microwave comprises a plurality of the flow tube assemblies connected in series forming a single flow channel.

16. The apparatus of claim 15, wherein a first flow tube assembly is connected to a second flow tube assembly via a microwave compatible pipe.

17. The apparatus of claim 3, wherein at least one electrodeless UV-emitting bulb is connected with the second pipe and one electrodeless UV-emitting bulb is connected with the third pipe.

18. The apparatus of claim 17, wherein at least one electrodeless UV-emitting bulb is made of sapphire, quartz, or glass.

19. The apparatus of claim 17, wherein the at least one electrodeless UV-emitting bulb comprises mercury.

20. The apparatus of claim 1, wherein the electrodeless UV-emitting bulb is longitudinally disposed throughout the flow tube assembly.

* * * * *